United States Patent
Hajek et al.

(10) Patent No.: US 6,841,253 B2
(45) Date of Patent: Jan. 11, 2005

(54) CURABLE MOLDING COMPOSITION AND SHAPED PLASTICS ARTICLES PRODUCED FROM SAID MOLDING COMPOSITION

(75) Inventors: Andreas Hajek, Brackenheim (DE); Stefan Harke, Sinsheim-Rohrbach (DE); Josef Geier, Rinchnach (DE); Klaus Hock, Regen (DE)

(73) Assignees: Blanco GmbH & Co. KG, Oberdingen (DE); Schock & Co. GmbH, Schorndorf (DE)

( * ) Notice: Subject to any disclaimer, the term of this patent is extended or adjusted under 35 U.S.C. 154(b) by 62 days.

(21) Appl. No.: 10/121,168

(22) Filed: Apr. 11, 2002

(65) Prior Publication Data

US 2003/0075834 A1 Apr. 24, 2003

Related U.S. Application Data

(63) Continuation of application No. PCT/EP00/08893, filed on Sep. 12, 2000.

(30) Foreign Application Priority Data

Oct. 14, 1999 (DE) .......................................... 199 49 461

(51) Int. Cl.$^7$ ............................ B32B 9/04; B32B 27/00
(52) U.S. Cl. .................... 428/421; 428/411.1; 428/220; 428/409; 524/267; 524/494
(58) Field of Search ................. 428/220, 409, 428/411.1, 421; 524/267, 494

(56) References Cited

U.S. PATENT DOCUMENTS

| | | | |
|---|---|---|---|
| 4,085,246 A | 4/1978 | Buser et al. ................. 428/220 |
| 4,256,625 A * | 3/1981 | Dachs ......................... 524/139 |
| 4,396,476 A | 8/1983 | Roemer et al. ......... 204/159.16 |
| 5,530,064 A * | 6/1996 | Ashton et al. ............... 525/102 |
| 5,578,673 A * | 11/1996 | Ashton et al. ............... 524/517 |
| 5,719,220 A | 2/1998 | Kirtley ........................ 524/267 |
| 5,753,741 A | 5/1998 | Harke et al. ................. 524/494 |
| 5,756,211 A | 5/1998 | Ittmann et al. .............. 428/409 |

FOREIGN PATENT DOCUMENTS

| | | |
|---|---|---|
| DE | 43 04 494 A1 | 8/1994 |
| DE | 43 27 610 A1 | 2/1995 |
| DE | 198 12 122 A1 | 9/1999 |
| EP | 0 716 097 B1 | 6/1996 |
| WO | WO94/18270 | 8/1994 |

OTHER PUBLICATIONS

Extract from Article: "Zonyl® MP 1400".

"Hostaflon TF9207 PTFE", Aug., 1996.

* cited by examiner

Primary Examiner—B. Hamilton Hess
Assistant Examiner—Lawrence Ferguson

(57) ABSTRACT

In order to obtain curable molding compositions and shaped plastics articles produced therefrom which have an improved hot-pot resistance, it is proposed that a curable molding composition for the production of shaped plastics articles contains, in addition to a liquid monomeric acrylate component and a particulate inorganic material, the latter in a concentration ranging from 45 to 85 wt % and preferably from 55 to 75 wt %, based on the molding composition, an additional portion comprising a particulate hydrophobic and/or oleophobic plastics material in a concentration of 0.5 wt % or more.

13 Claims, 1 Drawing Sheet

Figure 1:
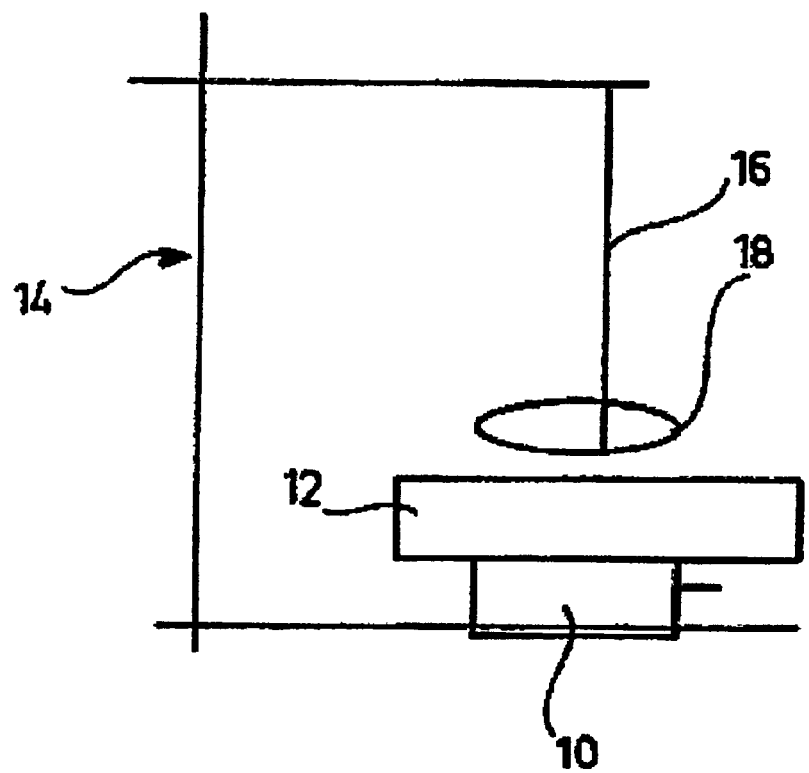

CURABLE MOLDING COMPOSITION AND SHAPED PLASTICS ARTICLES PRODUCED FROM SAID MOLDING COMPOSITION

This is a continuation of international PCT application No. PCT/EP00/08893 having international filing date of Sep. 12, 2000, which designates the United States, published in German under Article 21 (2).

The invention relates to a curable molding composition intended for the production of shaped plastics articles and containing a liquid monomeric acrylate component and a particulate inorganic material, the latter in a concentration of from 45 to 85 wt % and preferably from 55 to 75 wt %, based on the total molding composition. The invention also relates to shaped plastics articles produced using the aforementioned molding compositions. Furthermore, the invention relates to a process for the production of shaped plastics articles from the aforementioned curable molding compositions.

The aforementioned curable molding compositions are used to a large extent for the production of shaped plastics articles, particularly in the form of kitchen sink units, wash basins, bathtubs, showertubs, etc, and are distinguished by a number of excellent performance characteristics, particularly relatively good easy-clean characteristics, good abrasion resistance, etc.

A very significant property of shaped plastics articles, particularly when used in kitchens, is their so-called hot-pot resistance.

Prior art shaped plastics articles made of conventional curable molding compositions have a hot-pot resistance which makes them capable of withstanding pot temperatures of up to 260° C., particularly when exposed thereto for short periods only.

Since, when the shaped plastics articles are used in the kitchen, there will always be situations in which they are exposed to sudden temperature changes to even higher values than those mentioned above, there is a need for curable molding compositions and plastics articles made therefrom having an improved hot-pot resistance.

This object is achieved in the present invention in that the aforementioned curable molding composition additionally has a content of a particulate, hydrophobic and/or oleophobic plastics material in a concentration of 0.5 wt % or more.

We have found, surprisingly, that the addition of only relatively small portions of, say, 0.5 wt %, based on the molding composition, or more can effect a distinct improvement in the hot-pot resistance, ie, can achieve a hot-pot resistance of, say, up to 300° C., so that even cooking pots used, for example, for deep-frying and containing hot oils can be readily placed on kitchen sink units or kitchen worktops, ie, generally speaking, on any of the shaped plastics articles of the invention.

The improved hot-pot resistance (the term hot-pot resistance will be defined below in greater detail) rises to up to 300° C., at which temperature no kind of surface modification occurs, and at temperatures of up to 340° C. no changes in texture take place but only yellowing is observed, this frequently disappearing after a few days.

Furthermore, we have found, surprisingly, that the addition of the particulate, hydrophobic and/or oleophobic plastics material also effects a distinct improvement in scratch resistance. Thus there is a reduction in the scratch depth of up to ca 50%.

Furthermore, we have found that the excellent easy-clean properties arising when use is made of shaped plastics articles made of conventional curable molding compositions is further improved, since the soiling proneness of the surface is diminished to a greater degree by the presence of a small portion of said particulate, hydrophobic and/or oleophobic plastics material.

Another surprising result, possibly associated with the aforementioned effect, is that the surface of the shaped plastics article is somewhat smoother than that of shaped plastics articles made from conventional curable molding compositions.

Abrasive treatment, such as frequently occurs in the kitchen or bathroom when use is made of scouring agents, produces a glossy surface and not, as would be expected, a roughened, whitish lustrous surface. In this way the color effects intended by the use of, say, colored fillers in the shaped plastics article remain and do not suffer from such abrasive treatment.

The concentration of the hydrophobic and/or oleophobic material is usually restricted to not more than 15 wt %, since no further improvement in the aforementioned effects can be obtained above this limit.

The preferred range over which the hydrophobic and/or oleophobic particulate material is used, is the range of from 1 to 10 wt %.

The best results have been achieved in the range of from 2 to 7 wt %, particularly when also considered from the point of view of cost, and the most preferred range has been found to be from 3 to 6 wt %.

The particulate hydrophobic and/or oleophobic plastics material is preferably selected from the group comprising polytetrafluoroethylene, fluorocarbon elastomers based on vinylidene fluoride/hexafluoropropylene copolymer, polypropylene, and polypropylene copolymers.

The particle size of the particulate hydrophobic and/or oleophobic plastics material is not in fact critical, but an upper limit of the particle size or agglomerated particle size of 500 $\mu$m is recommended to avoid the addition of this material having an undesirable effect on the appearance of the face side of the shaped plastics article being made. At average particle sizes of $\leq$50 $\mu$m there is absolutely no impairment of the appearance of optically very exacting materials.

As stated above, the invention also relates to shaped plastics articles produced from the aforementioned curable molding compositions, which articles preferably have at least one top face layer comprising a molding composition of the invention.

If only the face layer comprises a curable molding composition of the invention and the rest of the shaped article is composed of some other molding composition, it is recommended that the face layer has a thickness of 1 mm or more. This layer thickness of 1 mm is adequate to provide the shaped plastics article with all of the advantages described above.

Preferably the hydrophobic and/or oleophobic material is substantially homogeneously distributed in the regions comprising the molding composition.

It is astonishing to observe that the reduction in the soiling proneness is attained substantially irrespective of whether the filler sinks down to the face side of the molding to accumulate in said region or not. Thus the person skilled in the art has a free choice concerning the filler systems to be used and the effects to be obtained therewith.

As mentioned above, the curable molding composition is particularly recommendable for the production of kitchen sink units or kitchen worktops as shaped articles, since in just such circumstances the hot-pot resistance is of special significance. Obviously the same applies to laboratory worktops or bench sinks or the like regularly exposed to high temperatures, caused, in particular, by placing hot objects thereon.

Finally, the invention also relates to a method of producing a shaped plastics article, in which use is made of a curable molding composition of the invention. To this end, the curable molding composition is formed by predispersing, in a first step, the desired amount of the hydrophobic and/or oleophobic material in a syrup containing the liquid, monomeric acrylate component, to which mixture of syrup and hydrophobic and/or oleophobic material there is then added the inorganic filler, and the molding composition thus produced is then placed in a mold and finally cured therein.

In one embodiment of the shaped plastics articles, only the face layer of the shaped plastics article comprises a molding composition of the invention, and a preferred method of producing the same is characterized in that first of all the face layer of the shaped plastics article is produced from a molding composition of the invention, after which the rest of the shaped article is produced from some other molding composition.

These and other advantages of the present invention are illustrated in greater detail below with reference to the following examples.

Mention will first be made of the various test methods used for assessing the surface quality of the shaped plastics articles produced in the present invention:

1. Hot-pot Resistance Test

A metal test object having the composition AlMgSi 0.5F25 (similar to DIN 12722 10/97) is heated to the appropriate test temperature in a muffle kiln. Following the removal of the test object from the muffle kiln, the temperature thereof is measured to confirm the test temperature. If the reading indicates a temperature higher than the test temperature, the test object is left until the required temperature is reached. The test object is then placed on the specimen to be tested. A stopwatch is started and the contours of the test object are indicated by drawing around the object with a pencil. After the object has rested on the specimen for 20 minutes, it is removed, and the sample is inspected for cracks, deformation and color changes. After a further 20 minutes, the tested area is again inspected in the cold state. The visible test results are then recorded.

2. Scratch Resistance

The scratch resistance is determined by the mechanical microstructure analysis method by INNOWEP (Germany) using the measuring unit MISTAN. To this end the surface topography of the sample is registered via a tracing pin, one measuring cycle comprising three topography analysis steps:

Step 1:

A nearly unweighted tracing pin traces the surface along a predetermined path. This continuously determines the vertical deflection to give the vertical profile.

Step 2:

The same path is traced with the same tracing pin carrying a specific additional load. This deforms the surface. The vertical profile thus found represents the total local deformation.

Step 3:

In the final step tracing is carried out again almost without any load. The resilient part of the total deformation has now recovered, and the vertical profile is specified only by the residual permanent deformation. The degree of scratch resistance is given by the extent of permanent deformation.

3. Cleaning Test

Assessment of the easy-clean properties, or in other words, of the soiling proneness of the shaped plastics article thus manufactured, is carried out using a synthetic model dirt batch, which is cleaned off under defined conditions. The elastic deformation is given as the difference between the total deformation and the permanent deformation.

The model dirt batch used has the following composition:

| | |
|---|---|
| 7 wt % | of Spezialschwarz 4, carbon black (Degussa AG) |
| 40 wt % | of process oil 310 (ESSO AG) |
| 17 wt % | of Arlypon DV, a $C_8$-fatty acid glycerol ester (Grünau Illertissen GmbH) |
| 36 wt % | of petroleum, bp 65/100° C. (Fluka: 12270) |

Abrasive Pretreatment 6 g of aluminum oxide in a particle-size range of from 63 μm to 200 μm (active neutral aluminum oxide 90 sold by Merck, Germany) are distributed over the specimen. This material is applied to the surface of the specimen using a moistened round sponge weighted by 4 kg and subjected to uniform circular motion at a rate of 60 rpm. This motion is stopped when the 100th revolution has been reached.

The model dirt batch on the surface to be tested is cleaned off using cleaning apparatus as illustrated diagrammatically in FIG. 1. The experimental arrangement is briefly described below:

A balance 12 is placed on an elevating platform 10, to which the sample (not shown) can be fixed.

A multispeed agitator 14 is positioned next to the arrangement of elevating platform 10 and balance 12 such that its motor shaft 16 is positioned vertically above the center of balance 12. Under test conditions, a round sponge 18 is fixed to the bottom free end of the motor shaft 16 and is non-rotatably attached to said shaft 16.

During execution of the clean-off test, the balance is raised by means of the elevating platform until the sponge is shown to be weighted by 4 kg.

Detailed Test Procedure 0.3 g of the model dirt batch comprising the aforementioned ingredients are placed on a watch glass and are uniformly spread over the test area (ca 10 cm²) with the aid of a dirt-saturated flat brush using horizontally and vertically overlapping brushstrokes. It is left for a period of 60 min. The surface is then washed with warm water until no more carbon black is removed. It is then rinsed with demineralized water and dried in air. The residual dirt is taken to be the color difference. The reference is always the unprocessed sample. It should be noted that the reference value should be measured for each individual sample, since the color values of the samples may differ from each other slightly.

Cleaning Procedure

The soiled samples are cleaned with 10 circular movements (at a speed of rotation of 60 rpm) under a weight of 4 kg. For this purpose there are used 6 g of the cleaner Blanco Clean (mineral cleaner content: 21.5%, sold by BLANCO, Germany). Cleaning is carried out using an unused, fine-pored, and moistened sponge having a diameter of ca 8 cm. Following cleaning, the test area is washed well, rinsed with demineralized water, and air-dried. The residual soil is taken to be the color difference measured against the unprocessed sample and is stated as the ΔE value:

$$\Delta E \sqrt{(L_{ref} - L_{sample})^2 + a_{ref} - a_{sample})^2 + (b_{ref} - b_{sample})^2}$$

The residual soil [% RS] is calculated from the ΔE values before and after cleaning of the surfaces concerned as follows:

$$RS = \frac{\Delta E_{cleaned}}{\Delta E_{soiled}} \cdot 100$$

The invention is illustrated below in greater detail with reference to examples and comparative examples:

EXAMPLE 1

2.0 kg of PMMA of normal type having a molecular weight $M_w$ ranging from 50.000 to 250.000 are dissolved in 8.0 kg of MMA, and to this solution there are added a release agent (35 g of stearic acid, sold by Merck, Germany) and a crosslinking agent (200 g of trimethylolpropane trimethacrylate, sold by Agomer, Germany). There is obtained a relatively viscous syrup.

In this syrup there are then dispersed 1.3 kg of a particulate PTFE powder (Zonyl MP 1400, sold by Du Pont, Germany) of irregular contour and having an average particle size of 12 µm. There are then added 28 kg of a quartz sand (silanized), in which each grain has a core substantially of quartz and a surface comprising substantially α-cristobalite (EP 0,716,097 B1. ACQ, sold by Quarzwerke, Germany) and is present in a particle-size range of from 100 µm to 500 µm. Then a white pigment dispersion, comprising 1.4 kg of the aforementioned syrup, 1.3 kg of another crosslinking agent (bisphenol-A-ethoxylate-2-dimethacrylate, sold by Akzo Nobel Chemical, Germany), and 2.3 kg of a white pigment (titanium(IV) oxide, sold by Kemira, Finland) is added. The inorganic filler content of the molding composition is 62.9 wt %. The addition of peroxides (60 g of Peroxan BCC, 120 g of Peroxan LP and 10 g of Peroxan TB in each case sold by Pergan, Germany) and thermal curing of the molding composition in suitable (kitchen sink unit) molds are then carried out.

Samples of the sink units are soiled with and without abrasive pretreatment (see above) and then cleaned under defined conditions (see above), and the residual soil remaining on the surface is determined by photoelectric photometry.

| | |
|---|---|
| Residual soil without abrasive pretreatment: | 3.0% |
| Residual soil with abrasive pretreatment: | 1.2% |

The hot-pot test carried out at a temperature of the specimen of 340° C. gave a value for ΔE of 3.2. This yellowing effect fell to ΔE=2.8 over 24 hours. No formation of blisters was observed.

Comparative Example 1

A standard sample, produced from a molding composition differing from that of Example 1 only in that the content of hydrophobic and oleophobic PTFE material was omitted, gave in the same test without and with abrasive preliminary treatment a residual soil of 12.8% and 7.8% respectively.

In the hot-pot test, a specimen temperature of 340° C. was used, this giving a ΔE value of 2.9, accompanied however by the formation of blisters. Following a further waiting period of 24 hours, the degree of yellowing was found to have fallen to ΔE=2.6, but the formation of blisters remained to an undiminished extent.

For comparison with the material described in the following example, a scratch resistance test was carried out, which yielded an elastic deformation of 4.2 µm. The permanent deformation was 6.4 µm.

EXAMPLE 2

In the syrup of Example 1 there are dispersed 1.3 kg of a particulate PTFE powder (Hostaflon TF 9207 PTFE, sold by Dyneon, Germany) of regular spherical contour and having an average particle size of 4 µm.

There are then added, as in Example 1, 28 kg of a quartz sand (silanized) in which each grain has a core substantially comprising quartz and a surface substantially comprising α-cristobalite (EP 0.716.097 B1, ACQ, sold by Quarzwerke, Germany) and existing in a particle-size range of from 100 µm to 500 µm. In other respects, the white pigment dispersion is added in the same composition and concentration as in Example 1.

The inorganic filler content of the molding composition is 62.9 wt %. The addition of peroxides and thermal curing of the molding composition in suitable (kitchen sink unit) molds is then carried out as described in Example 1.

Samples of the sink units are soiled with a synthetic model dirt batch with and without abrasive pretreatment, and the residual soil on the surface is determined by photoelectric photometry.

| | |
|---|---|
| Residual soil without abrasive pretreatment: | 5.6% |
| Residual soil with abrasive pretreatment: | 2.5% |

The scratch resistance additionally examined here gave an elastic deformation of 3.0 µm and a permanent deformation of 3.3 µm, ie permanent damage due to scratches on the tested surface reduced by a factor of almost 2% or 50%.

EXAMPLE 3

In the syrup of Example 1 there are dispersed 1.3 kg of a particulate PTFE powder (Zonyl MP 1400, sold by Du Pont, Germany) of irregular contour and having an average particle size of 12 µm and 1.3 kg of a particulate PTFE powder (Hostaflon TF 9207 PTFE, sold by Dyneon, Germany) of regular spherical contour and having an average particle size of 4 µm. As in Example 1, 28 kg of a quartz sand (silanized) are added in which each grain has a core substantially comprising quartz and a surface substantially comprising α-cristobalite (EP 0,716,097 B1, ACQ, sold by Quarzwerke, Germany) and which is present in a particle-size range of from 100 µm to 500 µm. In other respects, the white pigment dispersion is added in the same composition and concentration as in Example 1.

The inorganic filler content of the molding composition is 61.1 wt %. The addition of peroxides and thermal curing of the molding composition in suitable (kitchen sink unit) molds is then carried out as described in Example 1.

Samples of the sink units are soiled with a synthetic model dirt batch with and without abrasive pretreatment, and the residual soil on the surface is determined by photoelectric photometry.

| | |
|---|---|
| Residual soil without abrasive pretreatment: | 8.1% |
| Residual soil with abrasive pretreatment: | 4.5% |

EXAMPLE 4

In the syrup of Example 1, there are now dispersed 1.1 kg of a particulate PTFE powder (Zonyl MP 1400, sold by Du Pont, Germany) of irregular contour and having an average particle size of 12 $\mu$m.

There are then added 27 kg of an edge-rounded sand in a particle-size range of from 200 to 2000 $\mu$m (a mixture of the types 1/8, 2/9, 4/8 and 10/8 SIG silanized, sold by Dorfner in Amberg, Germany), which is equivalent to an inorganic filler content of 70.4 wt %. Following addition of the peroxides (40 g of Peroxan BCC and 80 g of Peroxan LP in each case sold by Pergan, Germany), thermal curing of the molding composition is carried out in suitable (kitchen sink unit) molds in a manner similar to that described in Example 1.

Samples of the sink units are soiled with a synthetic model dirt batch with and without abrasive pretreatment, and the residual soil on the surface is determined by photoelectric photometry.

| | |
|---|---|
| Residual soil without abrasive pretreatment: | 13.5% |
| Residual soil with abrasive pretreatment: | 4.8% |

In this example, the novel kitchen sink unit displays a degree of residual soil comparable to that found in the standard sample. However, the more important value indicating properties under continued use, namely the degree of residual soil on a tested surface previously subjected to abrasive preliminary treatment is, as in the other examples, distinctly below the said degree of soiling on the standard sample as shown in the following comparative Example 2.

Comparative Example 2

A standard sample produced from a molding composition of Example 4 but without any content of hydrophobic and oleophobic PTFE material, gave in the same test without and with abrasive preliminary treatment a residual soil of 12.3% and 8.8% respectively.

EXAMPLE 5

In the syrup of Example 1 there are dispersed 0.9 kg of a particulate PTFE powder (Zonyl MP 1400, sold by Du Pont, Germany) of irregular contour and having an average particle size of 12 $\mu$m together with 0.45 kg of a particulate PP powder (produced from Eltex HV 200 PF, sold by Solvay, Germany, by means of a cryogenic grinding process (Cryoclass®, sold by Messergriesheim)) of irregular contour and having an average size of <40 $\mu$m. There are then added, as in Example 1, 28 kg of a quartz sand (silanized), existing in a particle-size range of from 10 $\mu$m to 500 $\mu$m. The white pigment dispersion is then added. The inorganic filler content of the molding composition is 62.9 wt %. The addition of peroxides and thermal curing of the molding composition in suitable (kitchen sink unit) molds is then carried out as described in Example 1.

Samples of the sink units are soiled with a synthetic model dirt batch with and without abrasive pretreatment, and the residual soil on the surface is determined by photoelectric photometry.

| | |
|---|---|
| Residual soil without abrasive pretreatment: | 4.8% |
| Residual soil with abrasive pretreatment: | 4.9% |

EXAMPLE 6

In the syrup of Example 1 there are dispersed 1.3 kg of a particulate PP powder (produced from Eltex HV 200 PF, sold by Solvay, Germany, by means of a cryogenic grinding process (Cryoclass®, sold by Messergriesheim)) of irregular contour and having a particle size of <315 $\mu$m. There are added, as in Example 1, 28 kg of a quartz sand (silanized). A white pigment dispersion is then added, as described in Example 1. The inorganic filler content of the molding composition is 62.9 wt %. The addition of peroxides and thermal curing of the molding composition in suitable (kitchen sink unit) molds is then carried out as described in Example 1.

Samples of the sink units are soiled with a synthetic model dirt batch with and without abrasive pretreatment, and the residual soil on the surface is determined by photoelectric photometry.

| | |
|---|---|
| Residual soil without abrasive pretreatment: | 4.7% |
| Residual soil with abrasive pretreatment: | 5.6% |

Comparative Example 3

Panels of pure PTFE (Hostaflon, sold by Dyneon, Germany) are soiled with a synthetic model dirt batch with and without abrasive pretreatment and cleaned under defined conditions and the residual soil remaining on the surface is determined by photoelectric photometry.

| | |
|---|---|
| Residual soil without abrasive pretreatment: | 42% |
| Residual soil with abrasive pretreatment: | 32% |

TABLE 1

|  |  | Example 1 | Comparative Example 1 | Example 2 | Example 3 | Example 4 | Comparative Example 2 |
|---|---|---|---|---|---|---|---|
| | | Hydrophobic and/or oleophobic material | | | | | |
| | | PTFE | — | PTFE | PTFE | PTFE | — |
| | Conc. | 2.9 wt % | — | 2.9 wt % | 5.7 wt % | 2.9 wt % | — |
| | Particle size | 12 μm | | 4 μm | 12 μm/ 4 μm | 12 μm | |
| | | Filler | | | | | |
| | | ACQ | ACQ | ACQ | ACQ | SIG | SIG |
| | Conc. | 62.9 wt % | 64.8 wt % | 62.9 wt % | 61.1 wt % | 70.4 wt % | 72.5 wt % |
| | | Model dirt batch Residual soil | | | | | |
| Abrasive Pretreatment | Without | 3.0% | 12.8% | 5.6% | 8.1% | 13.5% | 12.3% |
| | With | 1.2% | 7.8% | 2.5% | 4.5% | 4.8% | 8.8% |

TABLE 2

|  |  | Comparative Example 3 | Example 5 | Example 6 |
|---|---|---|---|---|
| | | Hydrophobic and/or oleophobic material | | |
| | | PTFE | PP/PTFE 33/67 | Polypropylene |
| | Conc. | 100% | 2.9 wt % | 2.9 wt % |
| | Particle size | — | <40 μm/ 12 μm | <315 μm |
| | | Filler | | |
| | Conc. | — | ACQ 62.9 wt % | ACQ 62.9 wt % |
| | | Model dirt batch Residual soil | | |
| Abrasive Pretreatment | without | 42% | 4.8% | 4.7% |
| | with | 32% | 4.9% | 5.6% |

What is claimed is:

1. A curable molding composition for the production of shaped plastics articles containing a liquid monomeric acrylate component and a particulate inorganic material, said inorganic material being present in a concentration ranging from 45 to 85 wt %, based on the molding composition, wherein the molding composition also contains a particulate hydrophobic and/or oleophobic plastics material in a concentration of 0.5 wt % or more, said hydrophobic and/or oleophobic plastics material being selected from the group consisting of polytetrafluoroethylene, fluorocarbon elastomers based on vinylidene fluoride/hexfluoropropylene copolymers, polypropylene, and polypropylene copolymers, or mixtures of these substances.

2. A molding composition as defined in claim 1, wherein the concentration of the hydrophobic and/or oleophobic material is up to 15 wt %.

3. A molding composition as defined in claim 2, wherein the concentration of the hydrophobic and/or oleophobic material is from 1 to 10 wt %.

4. A molding composition as defined in claim 3, wherein the concentration of the hydrophobic and/or oleophobic material is from 1 to 7 wt %.

5. A molding composition as defined in claim 1, wherein the hydrophobic and/or oleophobic material exhibits a particle size or particle agglomerate size of <500 μm.

6. A shaped plastics article whenever produced from a molding composition as defined in claim 1 wherein said plastics material is present in an amount effective to increase hot pot resistance of said shaped plastics article.

7. A shaped plastics article as defined in claim 6, wherein at least a face layer of the shaped article comprises said molding composition and said hot pot resistance of said face layer is improved.

8. A shaped plastics article as defined in claim 7, wherein the face layer has a thickness of 1 mm or more.

9. A shaped plastics article as defined in claim 6, wherein the hydrophobic and/or oleophobic material is distributed substantially homogenously in the regions comprising the molding composition.

10. A shaped plastics article as defined in claim 6, wherein the shaped article is a kitchen sink unit or a kitchen worktop.

11. A molding composition as defined in claim 1, wherein the concentration of the hydrophobic and/or oleophobic material is from 55 to 75 wt %.

12. A molding composition as defined in claim 4, wherein the concentration of the hydrophobic and/or oleophobic material is from 2.5 to 6 wt %.

13. A molding composition as defined in claim 5, wherein the hydrophobic and/or oleophobic material exhibits a particle size or particle agglomerate size of, on average, ≦50 μm.

* * * * *

UNITED STATES PATENT AND TRADEMARK OFFICE
CERTIFICATE OF CORRECTION

PATENT NO. : 6,841,253 B2
DATED : January 11, 2005
INVENTOR(S) : Andreas Hajek et al.

It is certified that error appears in the above-identified patent and that said Letters Patent is hereby corrected as shown below:

Title page,
Item [73], Assignee, should read -- BLANCO GmbH + Co KG, Oberderdingen (DE); Schock & Co. GmbH, Schorndorf (DE) --.

Column 10,
Line 54, replace "$\leqq$" with -- $\leq$ --.

Signed and Sealed this

Twelfth Day of April, 2005

JON W. DUDAS
*Director of the United States Patent and Trademark Office*